(12) United States Patent
Lee

(10) Patent No.: US 10,425,758 B2
(45) Date of Patent: Sep. 24, 2019

(54) APPARATUS AND METHOD FOR REPRODUCING MULTI-SOUND CHANNEL CONTENTS USING DLNA IN MOBILE TERMINAL

(71) Applicant: Samsung Electronics Co., Ltd, Gyeonggi-do (KR)

(72) Inventor: Kyung-Hee Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/425,904

(22) Filed: Feb. 6, 2017

(65) Prior Publication Data

US 2017/0150287 A1 May 25, 2017

Related U.S. Application Data

(63) Continuation of application No. 14/557,196, filed on Dec. 1, 2014, now Pat. No. 9,843,879, which is a
(Continued)

(30) Foreign Application Priority Data

Nov. 9, 2009 (KR) .................... 10-2009-0107366

(51) Int. Cl.
*H04S 5/00* (2006.01)
*H04N 21/414* (2011.01)
(Continued)

(52) U.S. Cl.
CPC ......... *H04S 5/00* (2013.01); *H04N 21/41407* (2013.01); *H04N 21/4302* (2013.01);
(Continued)

(58) Field of Classification Search
CPC ...... G06F 17/30029; G06F 1/00; G06F 3/165; G06F 17/30761; G06F 15/16;
(Continued)

(56) References Cited

U.S. PATENT DOCUMENTS

| 3,725,586 A | 4/1973 | Iida |
| 4,289,928 A | 9/1981 | Takaoka et al. |

(Continued)

FOREIGN PATENT DOCUMENTS

| CN | 1522010 | 8/2004 |
| CN | 1522010 A | 8/2004 |

(Continued)

OTHER PUBLICATIONS

International SearchReport dated Jul. 12, 2011 in connection with International Patent Application No. PCT/KR2010/007336.
(Continued)

*Primary Examiner* — Gerald Gauthier

(57) ABSTRACT

An acoustic apparatus and a method thereof in a mobile terminal are provided. More particularly, an apparatus and a method for establishing a multi-sound system that provides sounds of sense of reality by connecting with players existing in the neighborhood and reproducing channels of contents using a plurality of players when reproducing the contents including multi-sound channels are provided. The apparatus includes a control player, a server player, and a client player. The control player selects players that reproduce respective channels using information of the channels forming the multi-sound channel contents. The server player analyzes the contents to be reproduced by the players to provide the information regarding the channels to the control player. The client player reproduces the channels of the relevant contents under control of the control player.

18 Claims, 5 Drawing Sheets

Related U.S. Application Data continuation of application No. 13/508,957, filed as application No. PCT/KR2010/007336 on Oct. 25, 2010, now Pat. No. 8,903,527.

(51) Int. Cl.
- H04N 21/436 (2011.01)
- H04N 21/439 (2011.01)
- H04N 21/443 (2011.01)
- H04N 21/81 (2011.01)
- H04N 21/43 (2011.01)

(52) U.S. Cl.
CPC ..... *H04N 21/439* (2013.01); *H04N 21/43615* (2013.01); *H04N 21/443* (2013.01); *H04N 21/8106* (2013.01); *H04N 21/8113* (2013.01)

(58) Field of Classification Search
CPC . G06F 17/00; G06F 17/30; H04S 5/00; H04S 5/02; H04S 7/30; G11B 19/02; H04H 60/80; H04R 3/12; H04L 12/2812; H04N 21/41407; H04N 21/4302; H04N 21/43615; H04N 21/439; H04N 21/443; H04N 21/8106; H04N 21/8113
USPC ..... 348/738; 370/315, 328, 338; 381/17, 80, 381/307, 58, 79, 311; 455/3.05, 3.06; 700/94; 709/229; 380/255
See application file for complete search history.

(56) References Cited

U.S. PATENT DOCUMENTS

| | | | |
|---|---|---|---|
| 4,953,021 A | 8/1990 | Ishikawa et al. | |
| 5,136,651 A | 8/1992 | Cooper et al. | |
| 5,524,053 A | 6/1996 | Iwamatsu | |
| 6,122,380 A * | 9/2000 | Pedlow, Jr. | H04N 5/607 348/483 |
| 6,421,447 B1 | 7/2002 | Chu | |
| 6,487,296 B1 * | 11/2002 | Allen | H04H 20/89 381/80 |
| 7,123,731 B2 | 10/2006 | Cohen et al. | |
| 7,492,907 B2 | 2/2009 | Klayman et al. | |
| 7,515,979 B2 * | 4/2009 | Shimizu | G10H 1/0058 381/119 |
| 7,734,055 B2 | 6/2010 | Chiloyan | |
| 7,822,496 B2 | 10/2010 | Asada et al. | |
| 7,903,816 B2 * | 3/2011 | Fujimoto | G06F 21/606 380/255 |
| 7,949,707 B2 | 5/2011 | McDowall et al. | |
| 8,045,722 B2 * | 10/2011 | Choi | H04S 3/002 381/100 |
| 8,046,093 B2 | 10/2011 | Yuen et al. | |
| 8,050,434 B1 | 11/2011 | Kato et al. | |
| 8,081,870 B2 | 12/2011 | Ito et al. | |
| 8,139,798 B2 | 3/2012 | Kotegawa et al. | |
| 8,255,960 B2 | 8/2012 | Yu | |
| 8,316,322 B2 | 11/2012 | Kim | |
| 8,364,476 B2 | 1/2013 | Vary et al. | |
| 8,411,768 B2 | 4/2013 | Umehara | |
| 8,544,046 B2 | 9/2013 | Gran et al. | |
| 8,594,815 B2 | 11/2013 | Konetski et al. | |
| 8,631,137 B2 | 1/2014 | Douillet et al. | |
| 8,655,346 B2 | 2/2014 | Kim et al. | |
| 8,718,537 B2 | 5/2014 | Sakata et al. | |
| 8,776,139 B2 | 7/2014 | De Vaan | |
| 8,798,777 B2 | 8/2014 | Mundy et al. | |
| 9,124,966 B2 * | 9/2015 | Kim | H04R 5/00 |
| 9,195,775 B2 | 11/2015 | Al-Shaykh et al. | |
| 9,445,213 B2 * | 9/2016 | Xiang | H04S 7/30 |
| 9,740,453 B2 * | 8/2017 | Millington | H04J 3/0664 |
| 9,843,879 B2 * | 12/2017 | Lee | H04N 21/4302 |
| 9,886,503 B2 * | 2/2018 | Mantel | G11B 27/105 |
| 2001/0037507 A1 * | 11/2001 | Mori | H04N 5/4401 725/97 |
| 2002/0129151 A1 * | 9/2002 | Yuen | H04S 3/002 709/229 |
| 2004/0162062 A1 | 8/2004 | Lee | |
| 2005/0122391 A1 | 6/2005 | Fukuda et al. | |
| 2006/0130114 A1 | 6/2006 | Kwon et al. | |
| 2007/0041599 A1 * | 2/2007 | Gauthier | H04R 1/403 381/307 |
| 2007/0087686 A1 * | 4/2007 | Holm | H04S 7/30 455/3.06 |
| 2007/0130308 A1 | 6/2007 | Kim et al. | |
| 2007/0174568 A1 | 7/2007 | Kii | |
| 2007/0211907 A1 * | 9/2007 | Eo | H04R 5/04 381/79 |
| 2007/0237115 A1 | 10/2007 | Bae et al. | |
| 2007/0250870 A1 | 10/2007 | Kim et al. | |
| 2007/0264975 A1 | 11/2007 | Bae et al. | |
| 2007/0266008 A1 | 11/2007 | Bae et al. | |
| 2008/0043938 A1 | 2/2008 | Yasuda | |
| 2008/0089268 A1 * | 4/2008 | Kinder | H04L 1/0015 370/315 |
| 2008/0109478 A1 | 5/2008 | Wada et al. | |
| 2008/0162669 A1 | 7/2008 | Tonoike et al. | |
| 2008/0235329 A1 | 9/2008 | Jeon | |
| 2008/0242222 A1 * | 10/2008 | Bryce | H04L 12/2809 455/3.06 |
| 2008/0247553 A1 * | 10/2008 | Katayama | G10K 15/12 381/17 |
| 2008/0250151 A1 | 10/2008 | Tomita | |
| 2009/0049074 A1 | 2/2009 | Dara-Abrams et al. | |
| 2009/0079883 A1 * | 3/2009 | Banks | G09G 5/003 348/738 |
| 2009/0081948 A1 * | 3/2009 | Banks | H04R 5/02 455/3.05 |
| 2009/0094519 A1 | 4/2009 | Yuen et al. | |
| 2009/0106414 A1 | 4/2009 | Stavenow et al. | |
| 2009/0138921 A1 | 5/2009 | Miyata | |
| 2009/0157892 A1 | 6/2009 | Sekiguchi et al. | |
| 2009/0175216 A1 * | 7/2009 | Bozarth | H04L 41/22 370/328 |
| 2009/0177971 A1 | 7/2009 | Kim et al. | |
| 2009/0222422 A1 | 9/2009 | Yoon et al. | |
| 2009/0222858 A1 | 9/2009 | Hjelm et al. | |
| 2009/0248702 A1 * | 10/2009 | Schwartz | G06F 17/30029 |
| 2009/0249420 A1 | 10/2009 | Kim et al. | |
| 2009/0271473 A1 | 10/2009 | Johnson | |
| 2009/0274326 A1 * | 11/2009 | Jia | H04J 3/0682 381/311 |
| 2009/0287802 A1 | 11/2009 | Koistinen et al. | |
| 2009/0298420 A1 * | 12/2009 | Haartsen | H04J 3/0658 455/3.06 |
| 2009/0300679 A1 | 12/2009 | Hiroi et al. | |
| 2010/0118188 A1 | 5/2010 | Nakajima et al. | |
| 2010/0135334 A1 * | 6/2010 | Briscoe | H04J 3/0664 370/503 |
| 2010/0284389 A1 * | 11/2010 | Ramsay | G06F 17/30017 370/338 |
| 2010/0306249 A1 | 12/2010 | Hill et al. | |
| 2012/0209960 A1 | 8/2012 | Harwell et al. | |
| 2012/0232684 A1 * | 9/2012 | Lee | H04N 21/4302 700/94 |

FOREIGN PATENT DOCUMENTS

| | | |
|---|---|---|
| CN | 1627819 A | 6/2005 |
| CN | 1774052 A | 5/2006 |
| CN | 1855284 A | 11/2006 |
| CN | 1953526 A | 4/2007 |
| CN | 101272303 | 9/2008 |
| CN | 101272303 A | 9/2008 |
| CN | 101547245 A | 9/2009 |
| EP | 1898674 A2 | 3/2008 |

OTHER PUBLICATIONS

Written Opinion of International Searching Authority dated Jul. 12, 2011 in connection with International Patent Application No. PCT/KR2010/007336.

(56) References Cited

OTHER PUBLICATIONS

Chinese Office Action dated Apr. 17, 2014 in connection with Chinese Patent Application No. 2010800506263, 12 pages.
Extended European Search Report dated Jul. 18, 2014 in connection with European Patent Application No. 10828461.3, 7 pages.
Translated Chinese Office Action dated Apr. 17, 2014 in connection with Chinese Patent Application No. 201080050626.3, 11 pages.
U.S. Office Action dated May 7, 2014 in connection with U.S. Appl. No. 13/508,957; 11 pages.
Text of Third Office Action dated Jun. 12, 2015 in connection with Chinese Patent Application No. 201080050626.3, 9 pages.
Notice of Preliminary Rejection, First Office Action dated Jun. 23, 2015 in connection with Korean Application No. 10-2009-0107366, 10 pages.
First Office Action dated Feb. 4, 2017 in connection with Chinese Application No. 2014104788625, 12 pages.
Office Action dated Mar. 30, 2017 in connection with U.S. Appl. No. 14/557,196, 11 pages.
Foreign Communication from a Related Counterpart Application, European Patent Application No. 10 828 461.3, Communication pursuant to Article 94(3) EPC dated May 15, 2017, 4 pages.
Communication from a foreign patent office in a counterpart foreign application, "The Second Office Action," Chinese Patent Application No. 2014104788625, dated Oct. 10, 2017, 15 pages.
Communication from a foreign patent office in a counterpart foreign application, "The Third Office Action," Chinese Patent Application No. 2014104788625, dated Apr. 9, 2018, 11 pages.
Summons to attend oral proceedings pursuant to Rule 115(1) EPC dated Apr. 2, 2019 in connection with European Patent Application No. 10828461.3, 6 pages.

\* cited by examiner

[Fig. 1]
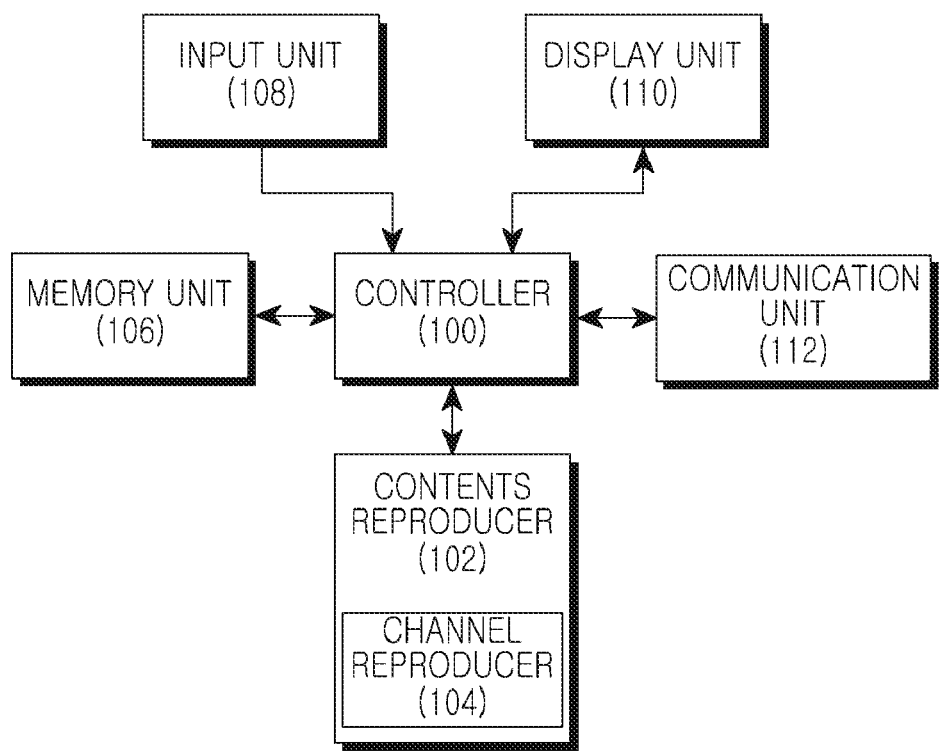

[Fig. 2]
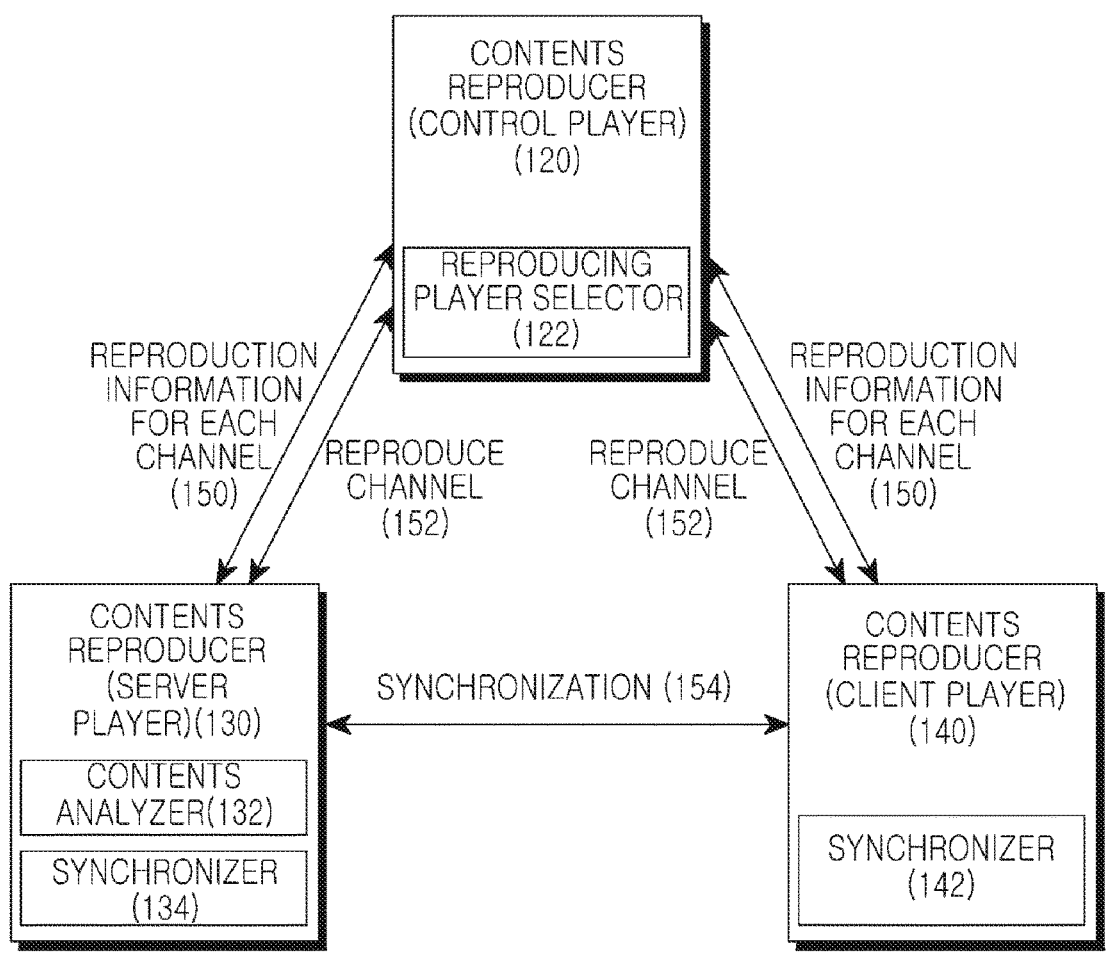

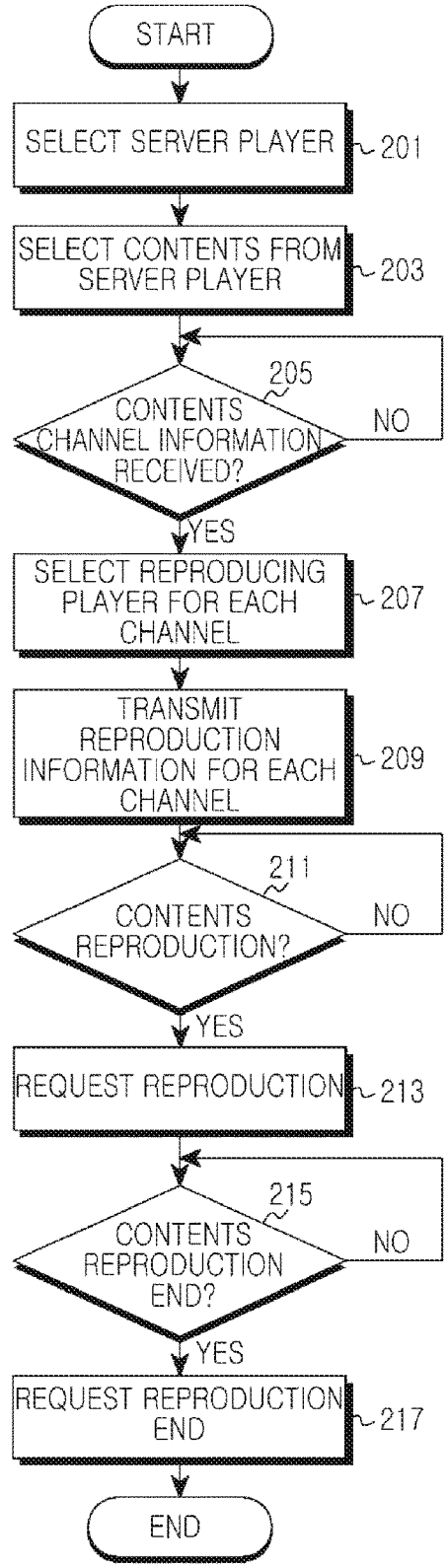
[Fig. 3]

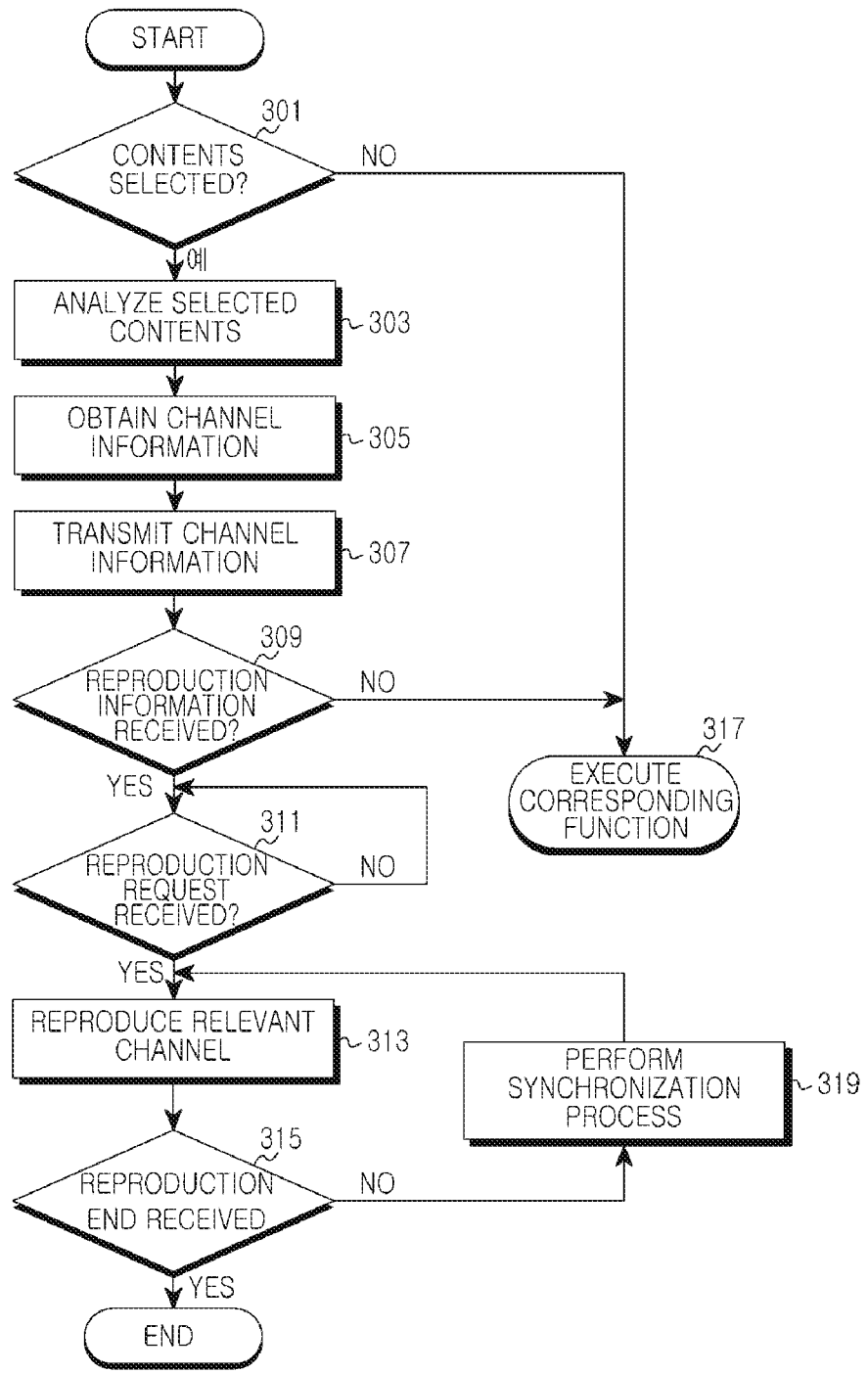
[Fig. 4]

[Fig. 5]
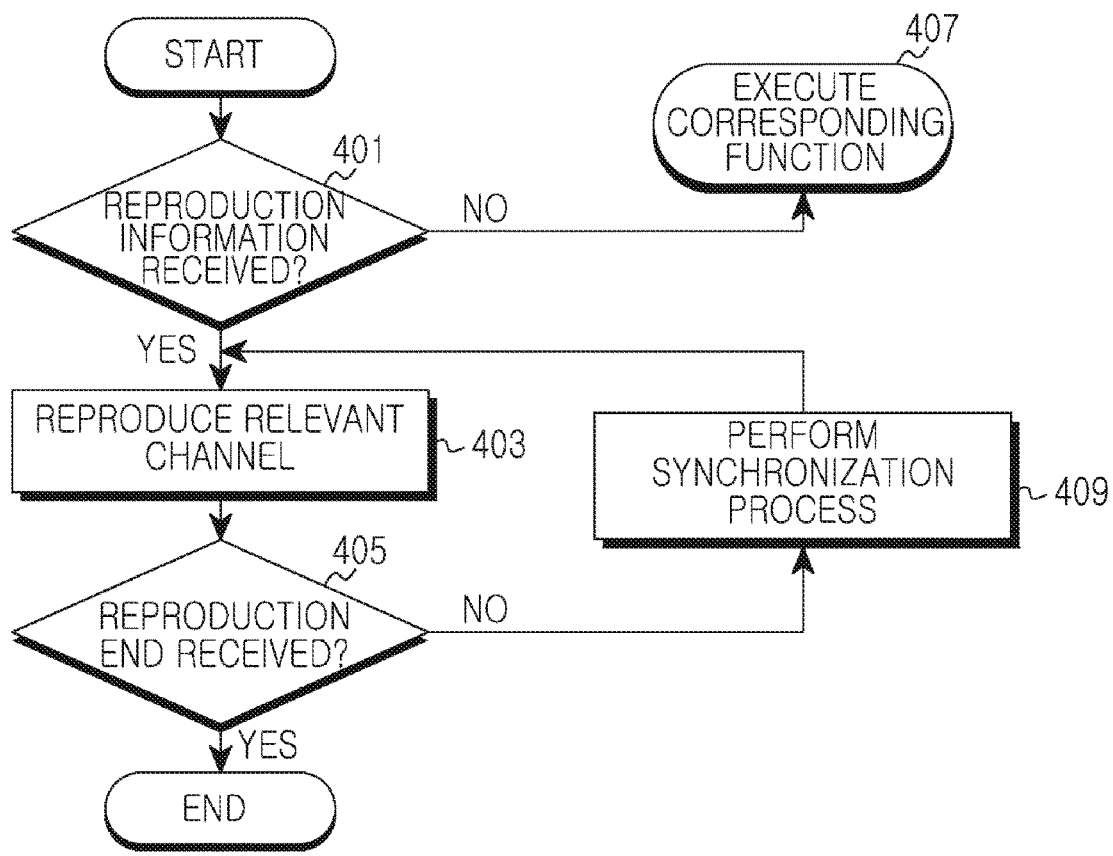

APPARATUS AND METHOD FOR REPRODUCING MULTI-SOUND CHANNEL CONTENTS USING DLNA IN MOBILE TERMINAL

This application is a continuation of U.S. patent application Ser. No. 14/557,196 filed Dec. 1, 2014 which is a continuation of U.S. patent application Ser. No. 13/508,957, filed May 9, 2012, entitled "APPARATUS AND METHOD FOR REPRODUCING MULTI-SOUND CHANNEL CONTENTS USING DLNA IN MOBILE TERMINAL", which claims priority under 35 U.S.C. § 365 to International Patent Application No. PCT/KR2010/007336 filed Oct. 25, 2010 entitled "APPARATUS AND METHOD FOR REPRODUCING MULTI-SOUND CHANNEL CONTENTS USING DLNA IN MOBILE TERMINAL". International Patent Application No. PCT/KR2010/007336 claims priority under 35 U.S.C. § 365 and/or 35 U.S.C. § 119(a) to Korean Patent Application No. 10-2009-0107366 filed Nov. 9, 2009 and which are incorporated herein by reference into the present disclosure as if fully set forth herein.

TECHNICAL FIELD

The present invention relates to an acoustic apparatus and a method thereof in a mobile terminal. More particularly, the present invention relates to an apparatus and a method for establishing a multi-sound system that provides sounds of sense of reality by connecting with players existing in the neighborhood and reproducing channels of contents using the plurality of players when reproducing the contents including multi-sound channels.

BACKGROUND ART

Recently, as a mobile terminal develops rapidly, a mobile terminal that enables wireless voice communication and information exchange has become a daily necessity. In an early stage of distribution, a mobile terminal was simply recognized as a product that can be carried and enables wireless communication. As a technology develops and a wireless Internet is introduced, the mobile terminal is used for not only the purpose of simple telephone communication or schedule management but also the purpose of games, a remote controller using short distance communication, and image capturing by a mounted digital camera, so that its utilization range is being widened, meeting a user's desire.

In accordance with a multimedia trend of the mobile terminal, a mobile terminal that can reproduce a music file has been developed and brought to the market recently. That is, the mobile terminal that can reproduce a music file is designed to allow a user to listen to music using only the mobile terminal even without the conventional Motion Picture Expert Group Audio Layer-3 (MP3) player or the conventional portable cassette player. With its convenience, the mobile terminal that can reproduce a music file is widely used by young people. Accordingly, the function of reproducing a music file has become an indispensable function of the mobile terminal and been used by a plurality of users.

In addition, recently, as a 5.1-channel audio compression system such as AC-3 and a Moving Picture Experts Group-2 (MPEG-2) has emerged, a plurality of products for home use using this audio compression system have developed. Therefore, unlike the conventional stereo method of discriminating left and right two channels and outputting sounds via the two channels, a surround audio system that positions a plurality of speakers to different points in order to improve a sense of realism has been realized.

However, since the conventional mobile terminal decodes/reproduces contents using one apparatus when reproducing the contents having multi-sound channels, the conventional mobile terminal cannot properly realize characteristics of the multi-sound channel contents.

That is, even when the conventional mobile terminal reproduces multi-sound contents, it cannot obtain an effect of an audio system of a 5.1 channel using the provided speaker, and provides a limited sound effect by operating independently from a multimedia apparatus existing in the neighborhood.

Therefore, an apparatus and a method for establishing an effective multi-sound system by connecting with a plurality of multimedia terminals existing in the neighborhood simultaneously with solving the above problems in the mobile terminal are required.

DISCLOSURE OF INVENTION

Solution to Problem

An aspect of the present invention is to address at least the above-mentioned problems and/or disadvantages and to provide at least the advantages described below. Accordingly, an aspect of the present invention is to provide an apparatus and a method for providing a multi-sound system in a mobile terminal.

Another aspect of the present invention is to provide an apparatus and a method for individually reproducing a channel forming contents using a plurality of terminals existing in the neighborhood in a mobile terminal.

Still another aspect of the present invention is to provide an apparatus and a method for selecting a terminal that reproduces a channel of contents in a mobile terminal.

In accordance with an aspect of the present invention, an apparatus for reproducing multi-sound channel contents is provided. The apparatus includes a control player for selecting players that reproduce respective channels using information of the channels forming the multi-sound channel contents, a server player for analyzing the contents to be reproduced by the players to provide the information regarding the channels to the control player, and a client player for reproducing the channels of the relevant contents under control of the control player.

In accordance with another aspect of the present invention, a method for reproducing multi-sound channel contents is provided. The method includes selecting players that reproduce respective channels using information of the channels forming the multi-sound channel contents, analyzing the contents to be reproduced by the players to provide the information regarding the channels to a control player, and reproducing the channels of the relevant contents under control of the control player.

BRIEF DESCRIPTION OF DRAWINGS

The above and other aspects, features and advantages of certain exemplary embodiments of the present invention will be more apparent from the following description taken in conjunction with the accompanying drawings in which:

FIG. 1 is a block diagram illustrating a mobile terminal that reproduces multi-sound channel contents using a DLNA network according to an exemplary embodiment of the present invention;

FIG. 2 is a block diagram illustrating a contents reproducer according to an exemplary embodiment of the present invention;

FIG. 3 is a flowchart illustrating a process for reproducing multi-sound channel contents using a DLNA network in a mobile terminal according to an exemplary embodiment of the present invention;

FIG. 4 is a flowchart illustrating a process for reproducing multi-sound channel contents using a DLNA network in a server player according to an exemplary embodiment of the present invention; and FIG. 5 is a flowchart illustrating a process for reproducing multi-sound channel contents using a DLNA network in a client player according to an exemplary embodiment of the present invention.

Throughout the drawings, like reference numerals will be understood to refer to like parts, components and structures.

BEST MODE FOR CARRYING OUT THE INVENTION

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

Exemplary embodiments of the present invention provide an apparatus and a method for establishing a multi-sound system that individually reproduces channels forming contents using a plurality of terminals existing in the neighborhood in a mobile terminal.

FIGS. 1-2 are block diagrams illustrating a mobile terminal according to an exemplary embodiment of the present invention.

FIG. 1 is a block diagram illustrating a mobile terminal that reproduces multi-sound channel contents using a Digital Living Network Alliance (DLNA) network according to an exemplary embodiment of the present invention.

Referring to FIG. 1, the mobile terminal is a control player that reproduces the contents using the DLNA network and includes both a server player and a client player.

The mobile terminal may include a controller 100, contents reproducer 102, a memory unit 106, an input unit 108, a display unit 110, and a communication unit 112. The contents reproducer 102 may include a channel reproducer 104.

First, the controller 100 of the mobile terminal controls an overall operation of the mobile terminal. For example, the controller 100 performs processes and controls for voice communication and data communication. In addition to the general functions, according to an exemplary embodiment of the present invention, in case of reproducing multi-sound channel contents using the DLNA network, the controller 100 selects a reproducing player for each channel forming the contents to operate the player depending on a relevant channel.

At this point, after selecting contents to be reproduced, the controller 100 receives channel information of the contents from a server player including the contents. After that, the controller 100 determines the channel information to select a player to be operated for each channel, and reproduces a channel allocated to a relevant player.

In the case where the mobile terminal operates as a control player, the contents reproducer 102 selects a reproducing player for each channel of contents under control of the controller 100. In the case where the mobile terminal operates as a client player, the contents reproducer 102 performs a synchronization process and reproduces a relevant channel of the contents.

At this point, the contents reproducer 102 allows the channel reproducer 104 to reproduce a channel corresponding to the contents.

The memory unit 106 includes Read Only Memory (ROM), Random Access Memory (RAM), flash ROM, and the like. The ROM stores microcodes of programs for processes and controls of the controller 100 and the contents reproducer 102, and various reference data.

The RAM serves as a working memory of the controller 100 and stores temporary data occurring during execution of various programs. In addition, the flash ROM stores various updatable data for storage such as a phonebook, calling messages, and received messages.

The input unit 108 includes a plurality of function keys such as numerical key buttons of 0 to 9, a menu button, a cancel button, an OK button, a TALK button, an END button, an Internet access button, navigation key buttons, letter input keys, and the like, and provides key input data (e.g., input for selecting contents to be reproduced) corresponding to a key pressed by a user to the controller 100.

The display unit 110 displays status information generated during an operation of the mobile terminal, a limited number of letters, a large amount of moving images and still images, and the like. The display unit 110 may be a color Liquid Crystal Display (LCD), an Active Mode Organic Light Emitting Diode (AMOLED), and the like.

The communication unit 112 transmits/receives a Radio Frequency (RF) signal of data input/output via an antenna (not illustrated). For example, during transmission, the communication unit 112 channel-codes and spreads data to be transmitted, and then performs an RF process on the signal to transmit the signal. During reception, the communication unit 112 converts a received RF signal into a baseband signal, and despreads and channel-decodes the baseband signal to recover data.

The function of the contents reproducer 102 may be performed by the controller 100 of the mobile terminal. The separate configuration and illustration of the contents reproducer 102 are an exemplary purpose only for inconvenience in description, not for limiting the scope of the present invention. It would be obvious to those skilled in the art that various modifications may be made within the scope of the present invention. For example, all of the functions of the contents reproducer 102 may be processed by the controller 100.

FIG. 2 is a block diagram illustrating a contents reproducer according to an exemplary embodiment of the present invention.

Referring to FIG. 2, the contents reproducer may be differently configured depending on an operation of a mobile terminal that uses a DLNA network.

That is, the contents reproducer 120 may be described differently for the case where the mobile terminal operates as a control player, for the case where the mobile terminal operates as a server player, and for the case where the mobile terminal operates as a client player.

First, in the case where the mobile terminal operates as a control player, the contents reproducer 120 may include a reproducing player selector 122.

The reproducing player selector 122 selects a player that reproduces each channel when the mobile terminal reproduces contents through a DLNA network using channel information of the contents received from a server player.

Additionally, in the case where the mobile terminal operates as a server player, the contents reproducer 130 may include a contents analyzer 132 and a synchronizer 134.

The contents analyzer 132 analyzes contents selected for reproduction by the control player to obtain channel information such as video, audio, a frame rate, codec information forming the contents. The synchronizer 134 is designed for synchronization of contents reproduction between players reproducing respective channels. The synchronizer 134 periodically transmits synchronization information for contents reproduction to a plurality of players (client players) during reproduction of the contents to synchronize with the client players.

Additionally, in the case where the mobile terminal operates as a client player, the contents reproducer 140 may include a synchronizer 142. Like the synchronizer 134 of the server player, the synchronizer 142 synchronizes in contents reproduction. At this point, the synchronizer 142 synchronizes with players in contents reproduction using synchronization information transmitted by the synchronizer 134 of the server player.

An operation of the contents reproducer is briefly described below.

First, when the contents reproducer 120 of the control player selects a server player and contents stored in the server player in order to select contents to be reproduced, the contents reproducer 130 of the server player allows the contents analyzer 132 to analyze the contents selected by the control player and obtain channel information, and transfers (150) the obtained channel information to the contents reproducer 120 of the control player.

Accordingly, the contents reproducer 120 of the control player allows the reproducing player selector 122 to select a player for reproducing each channel using the channel information and transfers (152) channel reproduction information so that the players reproduce relevant channels.

As illustrated, for reproduction synchronization, the contents reproducer 130 of the server player and the contents reproducer 140 of the client player periodically perform (154) a synchronization process while reproducing channels of the contents.

That is, each player reproduces only a channel allocated to itself among channels forming contents, and allows different players to reproduce channels of different contents through a DLNA network, thereby improving a sound effect.

An apparatus for establishing a multi-sound system by individually reproducing channels forming contents using a plurality of terminals existing in the neighborhood in a mobile terminal according to an exemplary embodiment of the present invention has been described. Hereinafter, a method for establishing a multi-sound system using the above apparatus according to an exemplary embodiment of the present invention is described.

FIG. 3 is a flowchart illustrating a process for reproducing multi-sound channel contents using a DLNA network in a mobile terminal according to an exemplary embodiment of the present invention.

Referring to FIG. 3, the mobile terminal controls a plurality of mobile terminals through a DLNA network to establish a multi-sound channel system. The mobile terminal may be called a control player.

First, the mobile terminal selects a server player in step 201, and selects contents to be reproduced from a plurality of contents included in the server player selected (in step 201) in step 203.

The mobile terminal determines whether contents channel information is received from the server player in step 205. Here, the contents channel information may be video, audio, a frame rate, and codec information forming relevant contents. That is, when the mobile terminal selects contents to be reproduced, the server player analyzes the contents selected by the mobile terminal to obtain contents channel information and transmits the information to the mobile terminal.

When not receiving the contents channel information in step 205, the mobile terminal re-performs the process of step 205.

In contrast, when receiving the contents channel information in step 205, the mobile terminal selects a reproducing player for each channel in step 207. Here, the mobile terminal selects players that reproduce respective channels forming contents including multi-sound channels using the DLNA network. In the case where the mobile terminal reproduces moving image contents, the mobile terminal selects a player that outputs an image and selects a player that reproduces sounds for each channel. At this point, the player that outputs the image can reproduce sounds of one channel basically.

The mobile terminal transmits reproducing player information selected in step 207 to each reproducing player to allow the relevant reproducing player to recognize a channel that needs to be reproduced by the relevant reproducing player in step 209.

The mobile terminal determines whether a reproduction request for relevant contents from a user of the mobile terminal is detected in step 211.

When not detecting the contents reproduction request in step 211, the mobile terminal re-performs the process of step 211 to determine whether a request for reproduction of relevant contents is received from the user.

In contrast, when detecting the contents reproduction request in step 211, the mobile terminal requests the players selected in step 207 to reproduce relevant contents in step 213. Accordingly, the mobile terminal may establish an effective multi-sound channel system by allowing the respective players to reproduce a plurality of channels of the contents through the DLNA network.

The mobile terminal determines whether a contents reproduction end is requested by the user in step 215.

When not requested to end contents reproduction in step 215, the mobile terminal re-performs the process of step 215.

In contrast, when requested to end contents reproduction in step 215, the mobile terminal requests the players that have been reproducing the channels of the contents to end the reproduction in step 217.

After that, the mobile terminal ends the present algorithm.

FIG. 4 is a flowchart illustrating a process for reproducing multi-sound channel contents using a DLNA network in a server player according to an exemplary embodiment of the present invention.

Referring to FIG. 4, the server player stores a plurality of contents. First, the server player for reproducing the multi-sound channel contents determines whether contents to be reproduced are selected by a mobile terminal for reproducing multi-sound channel contents in step 301. Here, step 301 denotes a process for allowing the mobile terminal to select contents to be reproduced using the DLNA network.

When contents are not selected by the mobile terminal in step 301, the server player performs a relevant function (e.g., an idle mode) in step 317.

In contrast, when the contents are selected by the mobile terminal in step 301, the server player analyzes contents selected by the mobile terminal in step 303, obtains channel information such as video, audio, a frame rate, and codec information forming the selected contents in step 305, and transmits the contents channel information obtained by analyzing the selected contents to the mobile terminal (control player) in step 307. Here, the contents channel information denotes information of channels that are reproducible by a plurality of players (client players) using the DNLA network.

The server player determines whether reproduction information is received in step 309. Here, the reproduction information denotes information regarding channels of the contents that should be reproduced by the server player through the DLNA network. The server player may output an image of the contents or reproduce sounds for each channel depending on the reproduction information.

When not receiving the reproduction information in step 309, the server player performs a relevant function (e.g., an idle mode for receiving reproduction information) in step 317.

In contrast, when receiving the reproduction information in step 309, the server player determines whether a contents channel reproduction request depending on the reproduction information is received from the mobile terminal in step 311.

When not receiving the contents channel reproduction request in step 311, the server player re-performs a process of step 311.

In contrast, when receiving the contents channel reproduction request in step 311, the server player reproduces a relevant channel with a plurality of players through the DLNA network by reproducing a channel corresponding to reproduction information according to the request of the mobile terminal.

The server player determines whether a reproduction end request for a channel of contents that is being reproduced is received from the mobile terminal in step 315.

When not receiving the reproduction end request in step 315, the server player performs a synchronization process with a plurality of players that reproduce channels of the contents in step 319. Here, the synchronization process denotes that the server player periodically transmits synchronization information for contents reproduction to a plurality of players (client players) while reproducing channels of contents through the DLNA network to synchronize with the respective players in multi-sound channel content reproduction.

In contrast, when receiving the reproduction end request in step 315, the server player ends reproduction of the contents channel which is being performed and then ends the present algorithm.

FIG. 5 is a flowchart illustrating a process for reproducing multi-sound channel contents using a DLNA network in a client player according to an exemplary embodiment of the present invention.

Referring to FIG. 5, the client player determines whether reproduction information is received in step 401. Here, the reproduction information denotes information regarding channels of the contents that should be reproduced by the client player through the DLNA network. The reproduction information may be provided from the mobile terminal (control player). The client player may output only an image of the contents or reproduce only sounds for each channel depending on the reproduction information.

When not receiving the reproduction information in step 401, the client player performs a relevant function (e.g., an idle mode for receiving reproduction information) in step 407.

In contrast, when receiving the reproduction information in step 401, the client player receives a contents channel reproduction request depending on the reproduction information from the mobile terminal and reproduces a channel corresponding to the reproduction information in step 403.

The client player determines whether a reproduction end request for a channel of contents that are being reproduced is received from the mobile terminal in step 405.

When not receiving the reproduction end request in step 405, the client player performs a synchronization process with a plurality of players (the server player and different client players) reproducing channels of the contents in step 409. Here, the synchronization process denotes that the client server periodically receives synchronization information for contents reproduction from the server player while reproducing a channel of the contents through the DLNA network, and then synchronizes with respective players in multi-sound channel contents reproduction.

In contrast, when receiving the reproduction end request in step 405, the client player ends the reproduction of the contents channel that is being performed, and ends the present algorithm.

As described above, according to exemplary embodiments of the present invention, a mobile terminal establishes a multi-sound system by allowing a plurality of terminals existing in the neighborhood to individually reproduce channels forming contents. The mobile terminal may resolve a problem that the conventional mobile terminal cannot realize a characteristic of multi-sound channel contents by allowing a plurality of mobile terminals to reproduce different channels forming contents.

Although the invention has been shown and described with reference to certain exemplary embodiments thereof, it will be understood by those skilled in the art that various changes in form and details may be made therein without departing from the spirit and scope of the invention as defined by the appended claims and their equivalents.

The invention claimed is:

1. An electronic device for reproducing multi-sound channel content, the electronic device comprising:
   a communication unit; and
   a controller configured to:
      control the communication unit to receive reproduction information regarding the multi-sound channel content,
      reproduce a corresponding audio channel among a plurality of audio channels comprised in the multi-sound channel content based on the received reproduction information, repetitively transmit a synchronization signal to at least one other electronic device reproducing another audio channel among the plurality of audio channels while reproducing the corresponding audio channel, and in response to receiving a reproduction end request, ceasing reproduction of the corresponding audio channel.

2. The electronic device of claim 1, wherein the controller is further configured to:

receive channel information regarding an audio channel to be reproduced by the electronic device among the plurality of audio channels comprised in the multi-sound channel content, and reproduce the audio channel corresponding to the received channel information.

3. The electronic device of claim 1, wherein the controller is further configured to reproduce the corresponding audio channel in response to a content reproduction request.

4. The electronic device of claim 1, wherein the controller is further configured to receive information for synchronization from one among the at least one other electronic device.

5. The electronic device of claim 2, wherein the channel information comprises at least one of video, audio, a frame rate, or codec information forming the multi-sound channel content to be reproduced.

6. The electronic device of claim 1, wherein the controller is further configured to use a Digital Living Network Alliance (DLNA) network to control reproduction of the plurality of audio channels.

7. The electronic device of claim 1, wherein the controller is further configured to receive the multi-sound channel content from one among the at least one other electronic device.

8. The electronic device of claim 7, wherein the multi-sound channel content is stored in a server.

9. The electronic device of claim 1, wherein the multi-sound channel content is stored in one of the at least one other electronic device.

10. A method for reproducing multi-sound channel content of an electronic device, the method comprising:

receiving reproduction information regarding the multi-sound channel content;

reproducing a corresponding audio channel among a plurality of audio channels comprised in the multi-sound channel content based on the received reproduction information;

repetitively transmit a synchronization signal to at least one other electronic device reproducing another audio channel among the plurality of audio channels while reproducing the corresponding audio channel; and in response to receiving a reproduction end request, ceasing reproduction of the corresponding audio channel.

11. The method of claim 10, wherein receiving the reproduction information comprises:

receiving channel information regarding an audio channel to be reproduced by the electronic device among the plurality of audio channels comprised in the multi-sound channel content, and wherein the reproducing comprises:

reproducing the audio channel corresponding to the received channel information.

12. The method of claim 10, wherein reproducing comprises:

reproducing the corresponding audio channel in response to a content reproduction request.

13. The method of claim 10, wherein transmitting the synchronization signal comprises:

receiving information for synchronization from one among the at least one other electronic device.

14. The method of claim 11, wherein the channel information comprises at least one of video, audio, a frame rate, or codec information forming the multi-sound channel content to be reproduced.

15. The method of claim 10, wherein the electronic device is connected with the at least one other electronic device via Digital Living Network Alliance (DLNA) network.

16. The method of claim 10, wherein the method reproduces the multi-sound channel content using a Digital Living Network Alliance (DLNA) network.

17. The method of claim 10, wherein the multi-sound channel content is selected from among a plurality of contents stored in a server.

18. The method of claim 10, wherein the multi-sound channel content is selected from among a plurality of contents stored in one of the at least one other electronic device.

* * * * *